Sept. 10, 1968   J. STEMLER   3,400,459
DENTAL HANDPIECE
Filed July 13, 1964
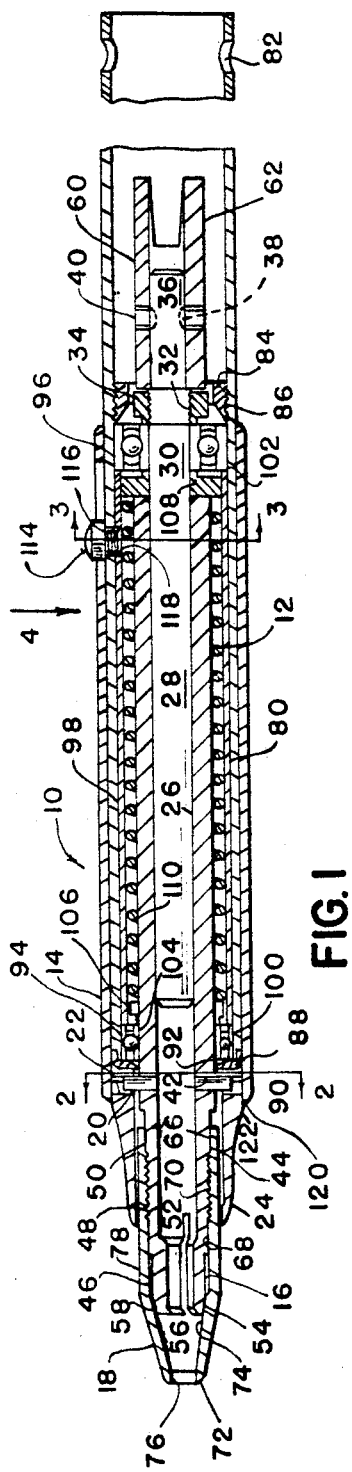
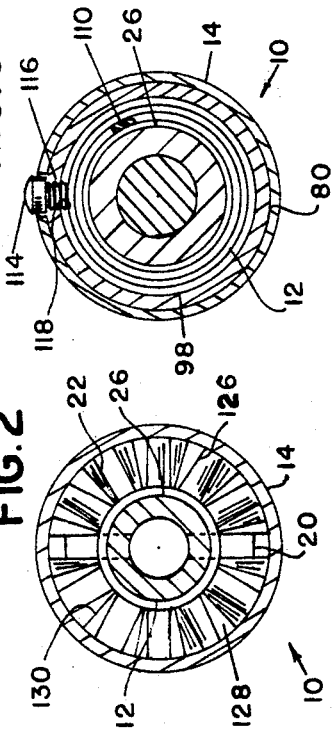
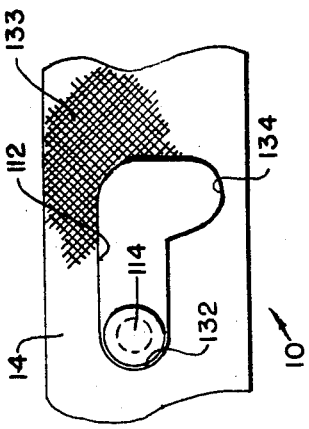
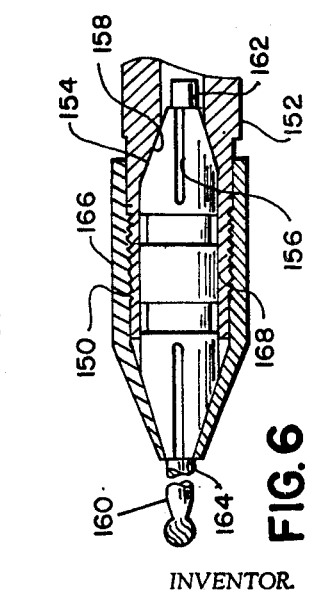
INVENTOR.
JOSEPH STEMLER
BY Whittemore,
Hulbert & Belknap
ATTORNEYS United States Patent Office 3,400,459
Patented Sept. 10, 1968

3,400,459
DENTAL HANDPIECE
Joseph Stemler, St. Clair Shores, Mich., assignor, by mesne assignments, to Ritter Pfaudler Corporation, Rochester, N.Y., a corporation of New York
Filed July 13, 1964, Ser. No. 382,202
12 Claims. (Cl. 32—26)

ABSTRACT OF THE DISCLOSURE

The invention relates to an improved dental handpiece having a collet and including means integral therewith for tightening and loosening the collet. The handpiece includes a rotatable collet shaft, collet means at one end of the shaft, an outer body tube and means operable between the collet shaft and outer body tube to guard against relative rotation therebetween to permit manual tightening and loosening of the collet. The locking means comprises pin and slot structure carried by the outer body tube and collet shaft and engageable with the outer body tube and collet shaft in a predetermined relative axial relation. The structure includes a bearing tube within the outer body tube and preloaded self-lubricating bearings within the bearing tube supporting the collet shaft for rotation therein.

---

In the past the changing of dental tools on a dental handpiece has usually required a separate wrench or other instrument for tightening and loosening the handpiece collet mechanism. The requirement for separate wrenches or the like for changing dental tools is undesirable in that often the separate wrenches cannot be found when desired causing the dentist to waste valuable time in manually struggling with the handpiece to tighten and loosen the collet thereof or in hunting for the misplaced wrench.

Wherein dental handpieces have previously been provided that do not require a separate wrench for tightening and loosening the collet thereof, the handpieces have been relatively complicated. These prior complicated dental handpieces are undesirable in that they have often been bulky and are expensive both in initial cost and in maintenance.

It is therefore one of the objects of the present invention to provide an improved dental handpiece.

Other objects and features of the invention will become apparent as the description proceeds, especially when taken in conjunction with the accompanying drawing, illustrating a preferred embodiment of the invention, wherein:

FIGURE 1 is a longitudinal section view of a dental handpiece constructed in accordance with the invention.

FIGURE 2 is an enlarged transverse cross section view of the dental handpiece illustrated in FIGURE 1 taken substantially on the line 2—2 in FIGURE 1.

FIGURE 3 is an enlarged transverse cross section view of the dental handpiece illustrated in FIGURE 1 taken substantially on the line 3—3 in FIGURE 1.

FIGURE 4 is an enlarged partial elevation view of the dental handpiece illustrated in FIGURE 1 taken in the direction of arrow 4 in FIGURE 1.

FIGURE 5 is a longitudinal section view of a modified collet and collet shaft for the dental handpiece illustrated in FIGURE 1.

FIGURE 6 is a longitudinal section view of another modified collet and collet shaft for the dental handpiece illustrated in FIGURE 1.

With particular reference to the figures of the drawing, one embodiment of the present invention will now be considered in detail.

As illustrated best in FIGURE 1 the dental handpiece 10 includes the collet shaft 12 rotatably mounted in the outer body tube 14 and movable axially with respect thereto. The dental handpiece 10 further includes the collet 16 integral with the end of the collet shaft 12 and the collet nut 18 threaded on the end of the collet shaft 12 for tightening and loosening the collet 16.

In operation of the dental handpiece 10 the outer body tube 14 is rotated with respect to the collet shaft 12 to permit relative axial movement therebetween. The outer body tube 14 is moved axially of the collet shaft 12 to the right in FIGURE 1 to engage the pins 20 pressed in the collet shaft 12 in the slots 22 in the nosepiece 24 rigidly secured to the outer body tube 14 to lock the outer body tube 14 and collet shaft 12 together to permit manual rotation of collet nut 18 without the aid of a separate wrench. Efficient connection and disconnection of dental tools to the dental handpiece 10 by means of collet 16 may therefore be accomplished.

More specifically the collet shaft 12 of the handpiece 10 includes the tubular portion 26 rigidly secured to the solid cylindrical shaft portion 28 by convenient means, such as brazing 30. The shaft portion 28 is provided with a threaded portion 32 on which the inner lock nut 34 is secured and the reduced diameter portion 36 having the depressions 38 therein in which set screws 40 are positioned. The tubular portion 26 of the collet shaft 12 includes the openings 42 extending therethrough in which the pins 20 are pressed and the reduced diameter portions 44 and 46.

Threads 48 and closely ground annular piloting surfaces 50 and 52 are provided on the reduced diameter portion 44 of the tubular portion 26 of collet shaft 12. The reduced diameter portion 44 of the tubular portion 26 of collet shaft 12 is provided with the tapered end surface 54, as illustrated best in FIGURE 1. Three slots 56 separated by one hundred twenty degrees are provided in the end 58 of the tubular portion 26 of the collet shaft 12, as shown in FIGURE 1, to provide the collet 16 integral with the collet shaft 12.

A coupling comprising a cylindrical member 60 is secured to the reduced diameter end portion 36 of the collet shaft 12 by means of the set screws 40. The coupling 60 includes the fingers 62 integral therewith and spaced apart by one hundred eighty degrees for connection to drive motor means (not shown) having a similar coupling secured thereto. The drive motor means may be carried by the handpiece 10.

The collet nut 18 includes the annular interior piloting surfaces 66 and 68 having the threaded interior portion 70 therebetween. The end 72 of collet nut 18 is provided with the tapered inner camming surface 74 and the opening 76 therein through which a dental tool shank may be inserted into the collet 16. The collet nut 18 is further provided with a knurled exterior surface 78.

In operation the collet nut 18 is threaded on the end 58 of the collet shaft 12 over the collet 16 to engage the tapered annular surface 54 of the collet and the tapered surface 74 of the collet nut 18 to tighten the collet about the shank of a dental tool (not shown) positioned therein. Unthreading the collet nut 18 will conversely loosen the collet 16 on the shank of a dental tool. The annular piloting surfaces 50 and 66 and 52 and 68 are provided to assure alignment of the collet nut 18 with the collet shaft 12, while the threads 48 and 70 provide axial movement of the collet nut 18 with respect to the collet shaft 12.

The bearing tube 80 is provided surrounding the collet shaft 12, as shown in FIGURE 1. Bearing tube 80 includes the transverse openings 82 therethrough by which the handpiece 10 may be secured to drive means therefor and the interior threaded portion 84 for receiving the outer lock nut 86. Bearing tube 80 further includes the annular end member 88 having the radially inwardly turned flange 90 thereon including the annular, radially inner bevelled surface 92.

Permanently sealed, self lubricating bearings 94 and 96 are positioned in the opposite ends of bearing tube 80, spaced apart axially by the bearing spacer sleeve 98, and function to rotatably mount the collet shaft 12 within the bearing tube 80. The outer race 100 of bearing 94 is locked between the flange 90 of end member 88 on bearing tube 80 and the bearing spacer sleeve 98 while the outer race 102 of bearing 96 is held securely between the bearing spacer sleeve 98 and the outer lock nut 86.

The inner race 104 of bearing 94 is abutted by the thrust washer 106 while the inner race of bearing 96 is abutted by the thrust washer 108 on one side and the inner lock nut 34 threaded on the collet shaft 12 on the other side. The spring 110 acts between the thrust washers 106 and 108 to urge the inner races of the bearings 94 and 96 in opposite directions whereby the bearings 94 and 96 are preloaded to eliminate noise and vibration thereof in operation and to provide compensation for bearing wear.

The outer body tube 14 is positioned over the bearing tube 80 for limited axial sliding movement and rotation relative thereto. The outer body tube 14 is provided with a bayonet slot 112 therein as shown best in FIGURE 4 and has a knurled surface. The locking screw 114 is threaded in the opening 116 through the bearing tube 80 and extends into the opening 118 in the bearing spacer sleeve 98. Screw 114 acts in conjunction with the bayonet slot 112 to limit the relative axial and rotational movement between the outer body tube 14 and the bearing tube 80. Screw 114 and bayonet slot 112 further serve to lock the outer body tube 14 in a leftward axial position with respect to the bearing tube 80 on clockwise rotation therebetween to cam screw 114 into end 134 in bayonet slot 112.

The nosepiece 24, as shown in FIGURE 1, is secured to the outer body tube 14 by convenient means, such as brazing 120. Nosepiece 24 is in radial spaced relation to the collet nut 18, as illustrated best in FIGURE 1, and is provided at end 122 with a plurality of radially opposite, longitudinally extending slots 22 therein for receiving the pins 20 with the outer body tube 14 in a rightward position on the bearing tube 80, as shown in FIGURE 1. The end abutments 126 between the slots 22 are provided with the bevelled end surfaces 128 terminating in the knife edges 130, as shown in FIGURE 2, to insure the camming of the pins 20 into radially opposite slots 22.

In over-all operation, with the dental handpiece 10 assembled as shown in FIGURE 1 and with the outer body tube 14 in an axially rightward position, as shown in FIGURE 1, with respect to the bearing tube 80 so that the nut 114 is in the end 132 of bayonet slot 112 and the pins 20 consequently cammed into one of the pairs of opposite slots 22 in the nosepiece 24, the knurled surface 78 of the collet nut 18 and the knurled outer surface 133 of the outer body tube 14 may be grasped and the nut and tube rotated relatively to tighten and loosen the collet nut 18 to clamp or release the shank of a dental tool (not shown) positioned in the collet 16. Without the engagement of the pins 20 in the slots 22 the collet shaft 12 would merely rotate with respect to the outer body tube 14 along with the collet 18 so that the collet would not be opened or closed by the collet nut 18.

After a dental tool has been secured in the collet 16 and it is desired to rotate the dental tool independently of the outer body tube 14 in use, the outer body tube 14 is moved axially to the left, as shown in FIGURE 1, with respect to the bearing tube 80 as far as allowed by the nut 114 in bayonet slot 112 and the outer body tube 14 is given a clockwise rotation, as illustrated in FIGURE 4, with respect to the bearing tube 80 to cam the screw 114 into the end 134 of the bayonet slot 112. The outer body tube 14 and bearing tube 80 are thus locked in a predetermined relative axial position with the pins 20 out of the slots 22 wherein rotation of the collet shaft 12 with respect to the outer body member 14 may be accomplished through coupling 60.

As indicated in FIGURE 1 the collet 16 is integral with the collet shaft 12. Such construction permits extremely accurate alignment of a dental tool held in collet 16 whereby vibration and noise, discomforting and sometimes painful to dental patients is reduced to a minimum. The collet is restricted to a single size for a particular handpiece however with such construction.

The modified collet 136 and collet shaft 138 illustrated in FIGURE 5 is provided to permit the use of a plurality of dental tools having different shank diameters with a single dental handpiece. With the structure illustrated in FIGURE 5 the collet shaft 138 is provided with a tubular portion 140 having a square end 142 into which separate collets 136 having different interior diameters 144 are positioned. The collets 136 are held in position on the collet shaft 138 by the collet nut 18 as before. If desired the collet shank 146 may be provided with a tapered friction surface engageable with a similar interior surface 148 on the collet shaft 138.

The modified collet 150 and collet shaft 152 illustrated in FIGURE 6 are similar to the collet and collet shaft illustrated in FIGURE 5 in that the collet is separate from the collet shaft. The collet 150 is however provided with a tapered shank 154 which has longitudinally extending, angularly spaced apart slots 156 therein. The tapered end 154 of the collet 150 acts in conjunction with the cooperating tapered portion 158 on collet shaft 152 to grip the dental tool 160 carried therein at the inner end 162 of the collet 150 in the same manner that the dental tool 160 is gripped at the outer end 164 of collet 150 on tightening of the collet nut 166 which may be piloted on the collet shaft 152 in the same manner as the collet nut 18 is piloted on the collet shaft 12. Similarly the collet 150 may be piloted in the end of the collet shaft 152 on the annular surface 168.

While one embodiment and modifications of the present invention have been considered in detail, it will be understood that other embodiments and modifications of the invention are contemplated. For example, the preloaded sleeve bearings may be used in place of the ball bearings illustrated in FIGURE 1. It is the intention to include all embodiments and modifications of the invention as are defined by the appended claims within the scope of the invention.

What I claim as my invention is:

1. A dental handpiece comprising a collet shaft, a bearing tube sleeved over the collet shaft, means adjacent the bearing tube for rotatably mounting the collet shaft, means connected to one end of the collet shaft for rotating the collet shaft, a collet at the other end of the collet shaft and connected thereto for rotation therewith, a collet nut operably associated with the collet for tightening and loosening the collet, an outer body tube sleeved over the bearing tube axially movable with respect to said collet shaft and means operable between the outer body tube and collet shaft for preventing relative rotation of the outer body tube and collet shaft in one relative axial position and for permitting relative rotation between the outer body member and collet shaft in other than the one relative axial position.

2. Structure as set forth in claim 1 and further including bearings positioned between the bearing tube and the collet shaft having inner and outer races with the outer bearing races locked in fixed position with respect to the bearing tube and preload means for urging the inner bearing races away from each other.

3. Structure as set forth in claim 2 wherein the preload means comprises thrust washers positioned at the adjacent sides of the bearing inner races and in engagement therewith and a spring extending therebetween under preloading compression.

4. Structure as set forth in claim 1 wherein the drive means comprises a cylindrical coupling member one end of which is sleeved over one end of the collet shaft, means securing the tubular member to the collet shaft for rotation therewith and a pair of coupling fingers integral with the opposite end of the tubular member and separated by one hundred eighty degrees.

5. Structure as set forth in claim 1 wherein the collet nut is threaded on the collet shaft, the collet is provided with a tapered radially outer annular end surface and the collet nut is provided with a similarly tapered radially inner, annular end surface engageable with the tapered surface of the collet for tightening the collet on threading of the collet nut on the collet shaft.

6. Structure as set forth in claim 5 wherein the collet shaft and collet nut are provided with complementary annular closely ground pilot surfaces to exactly align the collet nut on the collet shaft.

7. Structure as set forth in claim 1 wherein the means for selectively securing the collet shaft and outer body tube together against relative rotation comprises slot and pin means operable therebetween and engaged with the outer body tube in only one relative axial position with respect to the collet shaft.

8. Structure as set forth in claim 7 wherein the pin means is secured to the collet shaft and the slot means comprises a nosepiece secured to the outer body tube and having a plurality of radially opposite, axially extending slots in the one end thereof adjacent the pin means secured to the collet shaft.

9. Structure as set forth in claim 8 wherein the portions of the one end of the nosepiece between the axially extending slots are bevelled to guide the pin means into the slots therefor.

10. Structure as set forth in claim 1 and further including means for locking the outer body tube in a selected relative axial position with respect to the collet shaft wherein the means for securing the outer body tube and collet shaft together against relative rotation is not in engagement.

11. Structure as set forth in claim 10 wherein the means for locking the outer body tube and collet shaft in the predetermined axial position comprises a bayonet slot in the outer body tube and a screw positioned in the bayonet slot and releasably secured to the bearing shaft.

12. Structure as set forth in claim 6 wherein the collet is tapered and split longitudinally at both ends and the collet shaft and collet nut have complementary tapered surfaces thereon engageable with the tapered surfaces on the collet for tightening and loosening the collet.

References Cited

UNITED STATES PATENTS

| 2,251,057 | 7/1941 | Iseman | 32—26 |
| 2,876,015 | 3/1959 | Stever et al. | 32—26 X |
| 3,197,869 | 8/1965 | Staunt | 32—26 |

FOREIGN PATENTS 667,404  2/1952  Great Britain.

LOUIS G. MANCENE, *Primary Examiner.*

R. E. MORGAN, *Examiner.*